(12) United States Patent
Ivakitch

(10) Patent No.: US 12,467,383 B2
(45) Date of Patent: Nov. 11, 2025

(54) JOINT FOR CONNECTION TO VARIABLE GUIDE VANE OF GAS TURBINE ENGINE

(71) Applicant: Pratt & Whitney Canada Corp., Québec (CA)

(72) Inventor: Richard Ivakitch, Scarborough (CA)

(73) Assignee: PRATT & WHITNEY CANADA CORP., Québec (CA)

( * ) Notice: Subject to any disclaimer, the term of this patent is extended or adjusted under 35 U.S.C. 154(b) by 0 days.

(21) Appl. No.: 18/598,088

(22) Filed: Mar. 7, 2024

(65) Prior Publication Data

US 2025/0283420 A1    Sep. 11, 2025

(51) Int. Cl.
F01D 17/16    (2006.01)

(52) U.S. Cl.
CPC ........ F01D 17/162 (2013.01); *F05D 2240/50* (2013.01); *F05D 2260/31* (2013.01); *F05D 2260/50* (2013.01)

(58) Field of Classification Search
CPC ........ F01D 17/162; F04D 29/46; F04D 29/56; F05D 2240/50; F05D 2260/31; F05D 2260/50
See application file for complete search history.

(56) References Cited

U.S. PATENT DOCUMENTS

| | | | |
|---|---|---|---|
| 2,936,108 A * | 5/1960 | Swain, Jr. | F01D 17/162 74/105 |
| 3,295,764 A | 1/1967 | Geary et al. | |
| 3,824,032 A * | 7/1974 | Schegolev | F03B 3/183 415/150 |
| 4,130,375 A | 12/1978 | Korta | |
| 4,363,600 A | 12/1982 | Thebert | |
| 4,810,165 A | 3/1989 | Greune et al. | |
| 4,867,635 A | 9/1989 | Tubbs | |
| 4,979,874 A * | 12/1990 | Myers | F01D 17/162 415/160 |

(Continued)

FOREIGN PATENT DOCUMENTS

| CA | 1333695 C | 12/1994 |
|---|---|---|
| JP | S6234197 U | 2/1987 |

OTHER PUBLICATIONS

Extended European Search Report for EP Application No. 25162453.2, dated Aug. 1, 2025, pp. 1-9.

*Primary Examiner* — Courtney D Heinle
*Assistant Examiner* — Ryan C Clark
(74) *Attorney, Agent, or Firm* — CANTOR COLBURN LLP

(57) ABSTRACT

A variable pitch stator vane stage of a gas turbine engine includes a plurality of stator vanes extending across a flowpath of the gas turbine engine, and an actuation assembly operably connected to the plurality of start vanes. The actuation assembly includes an actuation ring extending circumferentially around an engine central longitudinal axis of the gas turbine engine, and a plurality of vane links. Each vane link operably connects a corresponding stator vane of the plurality of stator vanes to the actuation ring. A vane link of the plurality of vane links includes a link body, and a first link end connected the link body. The first link end includes a first spherical connection to the actuation ring. Circumferential movement of the actuation ring about the engine central longitudinal axis urges rotation of the plurality of vanes about their respective vane axes.

18 Claims, 6 Drawing Sheets

(56) References Cited

U.S. PATENT DOCUMENTS

| | | | | |
|---|---|---|---|---|
| 5,642,956 A * | 7/1997 | Hale | ............ | F16F 15/08 403/56 |
| 6,398,483 B1 * | 6/2002 | Conete | ............ | F01D 17/162 415/130 |
| 7,037,070 B2 * | 5/2006 | Raine | ............ | F04D 27/0246 415/149.4 |
| 7,938,430 B1 * | 5/2011 | Sahlem | ............ | B60D 1/30 280/455.1 |
| 7,938,620 B2 * | 5/2011 | Bouru | ............ | F01D 17/162 415/160 |
| 9,039,355 B2 * | 5/2015 | Pudvah | ............ | F16H 21/44 415/150 |
| 9,551,234 B2 | 1/2017 | Colette et al. | | |
| 10,364,828 B2 * | 7/2019 | Ikeguchi | ............ | F04D 29/563 |
| 10,385,721 B2 * | 8/2019 | Dumas | ............ | F01D 17/162 |
| 2006/0133890 A1 * | 6/2006 | Etoile | ............ | F16C 23/10 403/122 |
| 2006/0263206 A1 * | 11/2006 | Bouru | ............ | F01D 17/162 415/159 |
| 2012/0076658 A1 * | 3/2012 | Jarrett, Jr. | ............ | F01D 17/162 416/205 |
| 2012/0121403 A1 * | 5/2012 | Clemons | ............ | F04D 27/0246 415/208.1 |
| 2013/0058763 A1 * | 3/2013 | Keegan | ............ | F01D 17/162 415/148 |
| 2013/0149023 A1 * | 6/2013 | Wiecko | ............ | F16C 11/0695 403/79 |
| 2015/0050122 A1 | 2/2015 | Gutta et al. | | |
| 2017/0268375 A1 * | 9/2017 | Osborne | ............ | F01D 17/162 |
| 2018/0223685 A1 * | 8/2018 | Bromann | ............ | F04D 29/563 |
| 2019/0048738 A1 | 2/2019 | Perez | | |
| 2021/0095707 A1 | 4/2021 | Glaser et al. | | |
| 2022/0082121 A1 | 3/2022 | Castaneda et al. | | |
| 2022/0275732 A1 * | 9/2022 | Barbier-Neveu | ..... | F04D 29/563 |
| 2022/0356813 A1 * | 11/2022 | Kulecki | ............ | F01D 17/162 |
| 2022/0372890 A1 * | 11/2022 | Bentley | ............ | F01D 9/042 |

* cited by examiner

JOINT FOR CONNECTION TO VARIABLE GUIDE VANE OF GAS TURBINE ENGINE

BACKGROUND

Exemplary embodiments of the present disclosure pertain to the art of gas turbine engines.

Gas turbine engines are configured to operate across a wide range of operating conditions, such as speeds, loads, pressures, etc., also referred to as an "operating envelope". To adapt to these changing operating conditions, many gas turbine engines include variable guide vanes, which are stators that can change their incident angle utilizing an actuator and linkage arrangement to improve performance and operability in gas turbine engines. Similarly, gas turbine engines often include bleed off valves (BOV's) that use a linkage to open and close to bleed airflow from a core flowpath of the engine. The mechanisms which generate movement are often problematic and degrade/wear/fret over time. For example, some configurations use sheet metal arms which must twist during operation, generating high loads and wearing the pin bushing in the drive ring. Other configuration use composite bushings which also wear against their counterpart. One of the main contributors to wear and fretting can be slop/looseness in the system components when coupled with vibration. Wear and fretting in mating components can result in inaccuracy in the positioning of the variable guide vanes and BOV's.

BRIEF DESCRIPTION

In one exemplary embodiment, a variable pitch stator vane stage of a gas turbine engine, includes a plurality of stator vanes extending across a flowpath of the gas turbine engine, and an actuation assembly operably connected to the plurality of start vanes. The actuation assembly includes an actuation ring extending circumferentially around an engine central longitudinal axis of the gas turbine engine, and a plurality of vane links. Each vane link operably connects a corresponding stator vane of the plurality of stator vanes to the actuation ring. A vane link of the plurality of vane links includes a link body, and a first link end connected the link body. The first link end includes a first spherical connection to the actuation ring. Circumferential movement of the actuation ring about the engine central longitudinal axis urges rotation of the plurality of vanes about their respective vane axes.

Additionally or alternatively, in this or other embodiments the first link end includes a first eye, and a first spherical bearing element positioned in the first eye. The vane link is connected to the actuation ring through the first spherical bearing member.

Additionally or alternatively, in this or other embodiments the first link end a first link fastener extends through the actuation ring and the first spherical bearing member thereby connecting the vane link to the actuation ring.

Additionally or alternatively, in this or other embodiments a length of the vane link is adjustable.

Additionally or alternatively, in this or other embodiments the length of the vane link is adjustable via a threaded connection of the link body to the first link end.

Additionally or alternatively, in this or other embodiments a vane arm is operably connected to a vane of the plurality of vanes and is connected to a second link end of the vane link. The second link end includes a spherical connection to the vane arm.

Additionally or alternatively, in this or other embodiments the second link end includes a second eye and a second spherical bearing member positioned in the second eye. The vane link is connected to the vane arm through the second spherical bearing member.

Additionally or alternatively, in this or other embodiments a second link fastener extends through the vane arm and the second spherical bearing member thereby connecting the vane link to the vane arm.

In another exemplary embodiment, a compressor section of a gas turbine engine includes one or more rotor stages configured to rotate about an engine central longitudinal axis, and one or more stator stages, the one or more stator stages including a variable pitch stator vane stage. The variable pitch stator vane stage includes a plurality of stator vanes extending across a flowpath of the gas turbine engine, and an actuation assembly operably connected to the plurality of start vanes. The actuation assembly includes an actuation ring extending circumferentially around the engine central longitudinal axis of the gas turbine engine, and a plurality of vane links, each vane link operably connecting a corresponding stator vane of the plurality of stator vanes to the actuation ring. A vane link of the plurality of vane links includes a link body and a first link end connected the link body. The first link end includes a first spherical connection to the actuation ring. Circumferential movement of the actuation ring about the engine central longitudinal axis urges rotation of the plurality of vanes about their respective vane axes.

Additionally or alternatively, in this or other embodiments the first link end includes a first eye and a first spherical bearing member positioned in the first eye. The vane link is connected to the actuation ring through the first spherical bearing member.

Additionally or alternatively, in this or other embodiments a first link fastener extends through the actuation ring and the first spherical bearing member thereby connects the vane link to the actuation ring.

Additionally or alternatively, in this or other embodiments a length of the vane link is adjustable.

Additionally or alternatively, in this or other embodiments the length of the vane link is adjustable via a threaded connection of the link body to the first link end.

Additionally or alternatively, in this or other embodiments a vane arm is operably connected to a vane of the plurality of vanes and is connected to a second link end of the vane link. The second link end includes a spherical connection to the vane arm.

Additionally or alternatively, in this or other embodiments the second link end includes a second eye and a second spherical bearing member located in the second eye. The vane link is connected to the vane arm through the second spherical bearing member.

Additionally or alternatively, in this or other embodiments a second link fastener extends through the vane arm and the second spherical bearing member thereby connects the vane link to the vane arm.

In yet another exemplary embodiment, a gas turbine engine includes a combustor section, a turbine section driven by products of the combustion section, a compressor section driven by rotation of the turbine section, and a variable pitch stator vane stage positioned at at least one of the turbine section and the compressor section. The variable pitch stator vane stage includes a plurality of stator vanes extending across a flowpath of the gas turbine engine and an actuation assembly operably connected to the plurality of start vanes. The actuation assembly includes an actuation ring extending circumferentially around an engine central longitudinal axis of the gas turbine engine and a plurality of vane links, each vane link operably connecting a corresponding stator vane of the plurality of stator vanes to the actuation ring. A vane link of the plurality of vane links includes a link body and a first link end connected the link body. The first link end includes a first spherical connection to the actuation ring. Circumferential movement of the actuation ring about the engine central longitudinal axis urges rotation of the plurality of vanes about their respective vane axes.

Additionally or alternatively, in this or other embodiments the first link end includes a first eye and a first spherical bearing member positioned in the first eye. The vane link is connected to the actuation ring through the first spherical bearing member.

Additionally or alternatively, in this or other embodiments a first link fastener extends through the actuation ring and the first spherical bearing member thereby connecting the vane link to the actuation ring.

Additionally or alternatively, in this or other embodiments a length of the vane link is adjustable via a threaded connection of the link body to the first link end.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
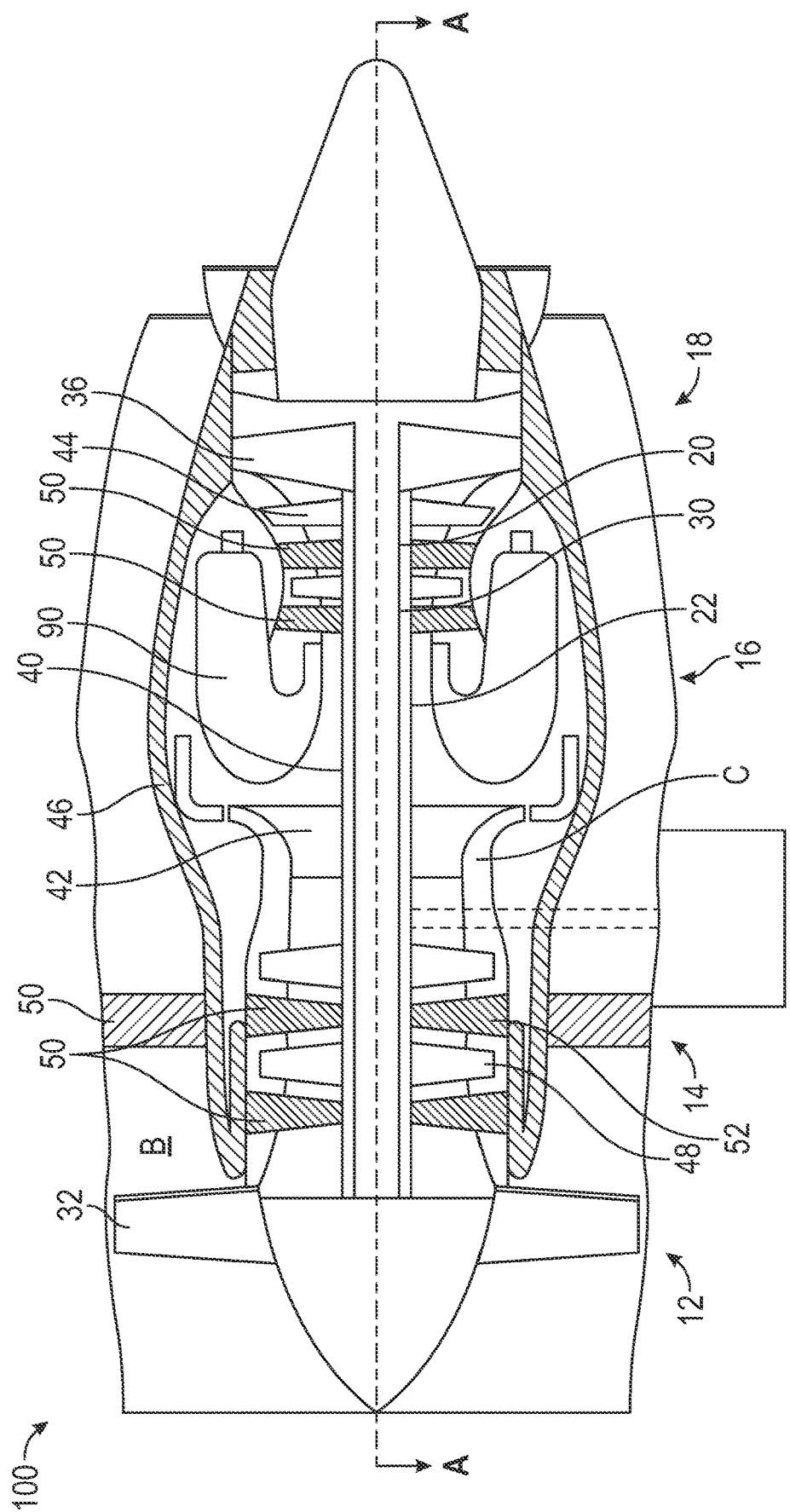
FIG. 1 is a partial cross-sectional view of an embodiment of a gas turbine engine.

FIG. 1 schematically illustrates a gas turbine engine 10. The gas turbine engine 10 is disclosed herein as a two-spool turbofan that generally incorporates a fan section 12, a compressor section 14, a combustor section 16 and a turbine section 18. Alternative engines might include other systems or features. The fan section 12 drives air along a bypass flow path B in a bypass duct, while the compressor section 14 drives air along a core flow path C for compression and communication into the combustor section 16 then expansion through the turbine section 18. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 10 generally includes a low speed spool 20 and a high speed spool 22 mounted for rotation about an engine central longitudinal axis A relative to an engine static structure 26.

The low speed spool 20 generally includes an inner shaft 30 that interconnects a fan 32, and a low pressure turbine 36. The high speed spool 22 includes an outer shaft 40 that interconnects an impeller 42 and high pressure turbine 44. A combustor 90 is arranged in exemplary gas turbine 10 between the impeller 42 and the high pressure turbine 44. The inner shaft 30 and the outer shaft 40 are concentric and rotate about the engine central longitudinal axis A which is collinear with their longitudinal axes.

The core airflow is compressed by the impeller 42, mixed and burned with fuel in the combustor 90, then expanded over the high pressure turbine 44 and low pressure turbine 36. The turbines 36, 44 rotationally drive the respective low speed spool 20 and high speed spool 22 in response to the expansion. It will be appreciated that each of the positions of the fan section 12, compressor section 14, combustor section 16, and turbine section 18, may be varied. While the structure described herein is a two-spool gas turbine engine 10, one skilled in the art will readily appreciate that the present disclosure may be similarly applied to a single spool or three or more spool gas turbine engine 10. The core flow path C is separated from the bypass flowpath B by a core casing 46 that encloses the compressor section 14, the combustor section 16 and the turbine section 18. The compressor section 14 includes two or more compressor stages, with each compressor stage including at least a compressor rotor 48. In some embodiments, one or more of the compressor rotors 48 is an impeller.

One or more of the fan section 12, the compressor section 14 and the turbine section 18 includes a stator stage 50 including a plurality of variable guide vanes 52. For clarity of explanation, the present description will describe the stator stage 50 as being includes at the compressor section 14, but one skilled in the art will readily appreciate that the description may be readily adapted to a stator stage 50 positioned at the fan section 12 and the turbine section 18.

Figure 2:
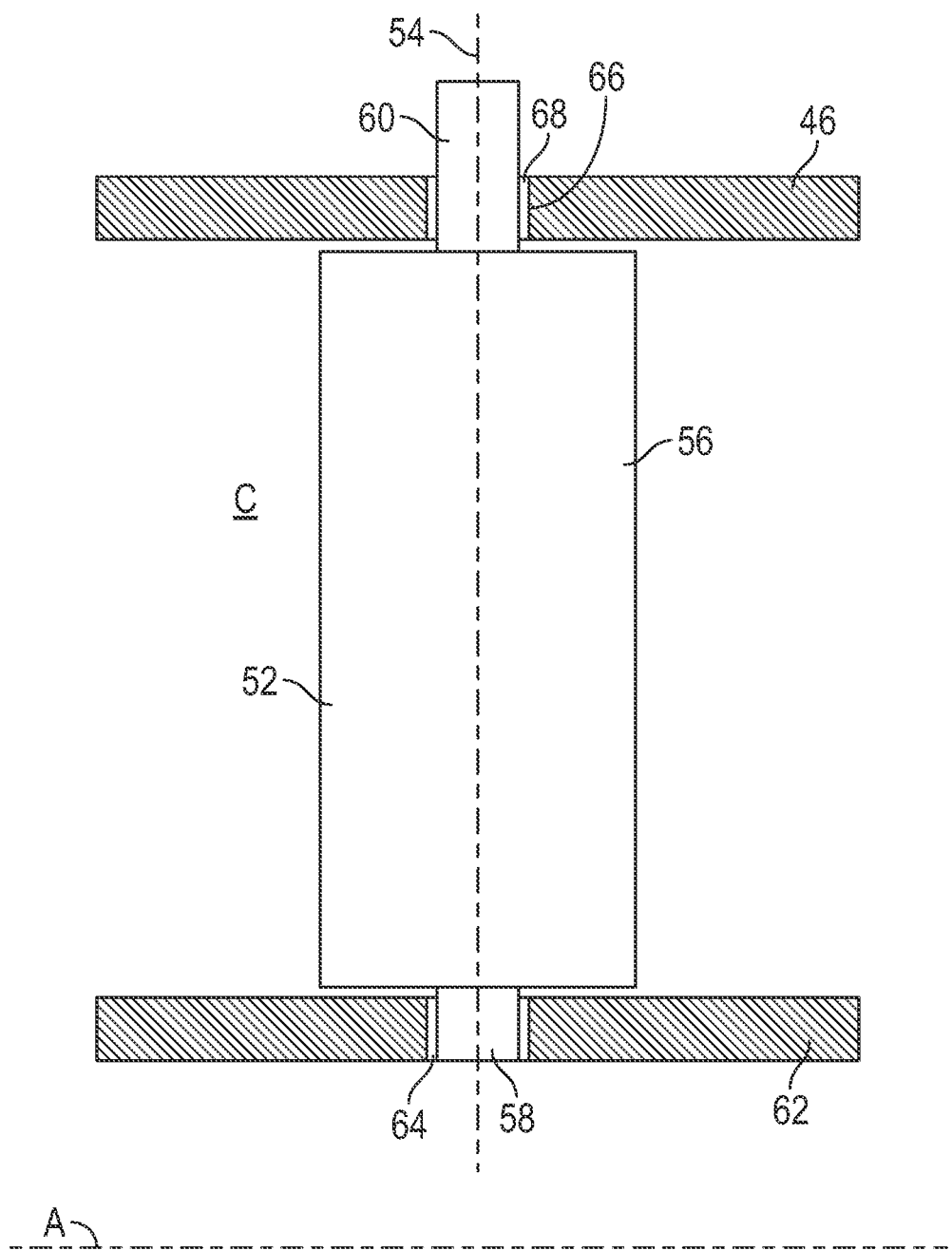
FIG. 2 is a partial cross-sectional view of an embodiment of a variable pitch stator vane.

As stated, the stator stage 50 includes the plurality of variable guide vanes 52, which are each configured to rotate about their respective vane axis 54. Referring now to FIG. 2, an embodiment of a vane 52 is illustrated. The vane 52 includes a vane body 56 extending across the core flowpath C, and further includes an inner vane stem 58 extending radially inwardly from the vane body 56 and an outer vane stem 60 extending radially outwardly from the vane body 56. The inner vane stem 58 is positioned at an inner frame 62 and may be supported by an inner bearing 64. The outer vane stem 60 extends through a vane opening 66 in the core casing 46 and may be supported in the vane opening 66 by an outer bearing 68.

Figure 3:
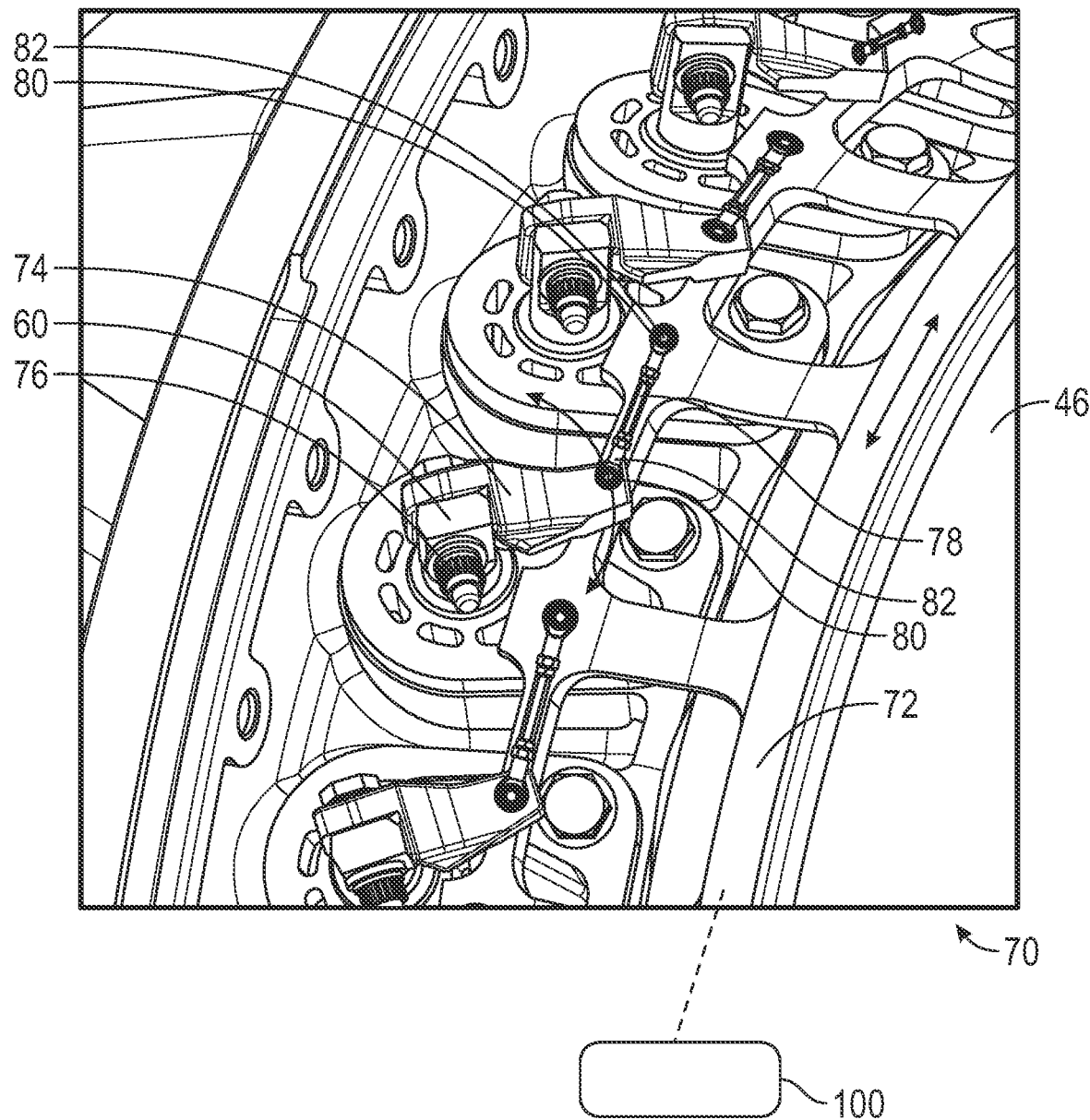
FIG. 3 is a partial perspective view of an embodiment of a variable stator vane actuation assembly.

Referring now to FIG. 3 with continuing reference to FIG. 2, the vane 52 is connected to an actuation assembly 70 which drives rotation of each of the vanes 52 about the respective vane axes 54 and also controls the rotational position of the vanes 52 relative to their respective vane axes 54. The outer vane stem 60 protrudes from the core casing 46 and is operably connected to the actuation assembly 70 which is also positioned radially outside of the core casing 46.

Each outer vane stem 60 is connected to an actuation ring 72 of the actuation assembly 70 via a vane arm 74 secured to the outer vane stem 60, In some embodiments, the vane arm 74 is secured to the outer vane stem 60 by a fastener, such as a vane arm bolt 76. The vane arm 74 is connected to the actuation ring 72 via a vane link 78. The vane link 78 is secured to each of the actuation ring 72 and the vane arm 74 via link fasteners 80 at each link end 82 of the vane link 78. The actuation ring 72 is configured to be driven is a circumferential around the core casing 46. This circumferential movement of the actuation ring 72 urges rotation of each of the vanes 52 about their respective vane axes 54. The actuation ring 72 is operably connected to an actuator 100, such as a hydraulic, mechanical, electromechanical or electrical actuator 100 to urge the circumferential movement of the actuation ring 72 relative to the engine central longitudinal axis A.

Figure 4:
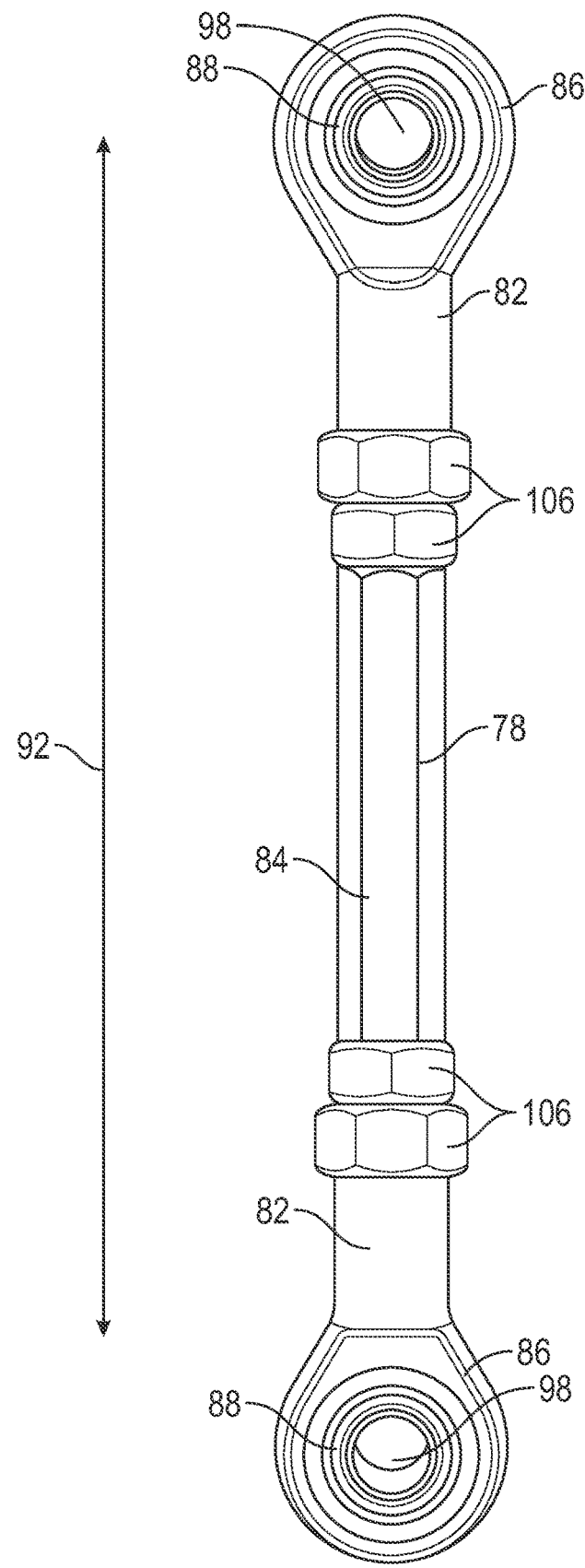
FIG. 4 is a perspective view of an exemplary embodiment of a vane link.

As illustrated in FIG. 4, and with continuing reference to FIG. 3, the vane link 78 includes a link body 84 and a ball joint or spherical bearing configuration at each link end 82. The embodiment of FIG. 4 in particular illustrates a spherical bearing configuration, with each link end 82 having an eye 86 with a spherical bearing member 88 located therein. The link fasteners 80 extend at least partially through a bearing opening 98 in the spherical bearing member 88 to connect the vane link 78 to the vane arm 74 and to the actuation ring 72. The bearing member 88 is movable inside the eye 86, such that there is a reduced incidence of the link fasteners binding when installed to the bearing member 88, thus reducing stresses in the actuation assembly 70 and improving operability and accuracy of the positioning of the plurality of vanes 52. In other embodiments, the link ends 82 may be similarly configured as ball joints.

Figure 5:
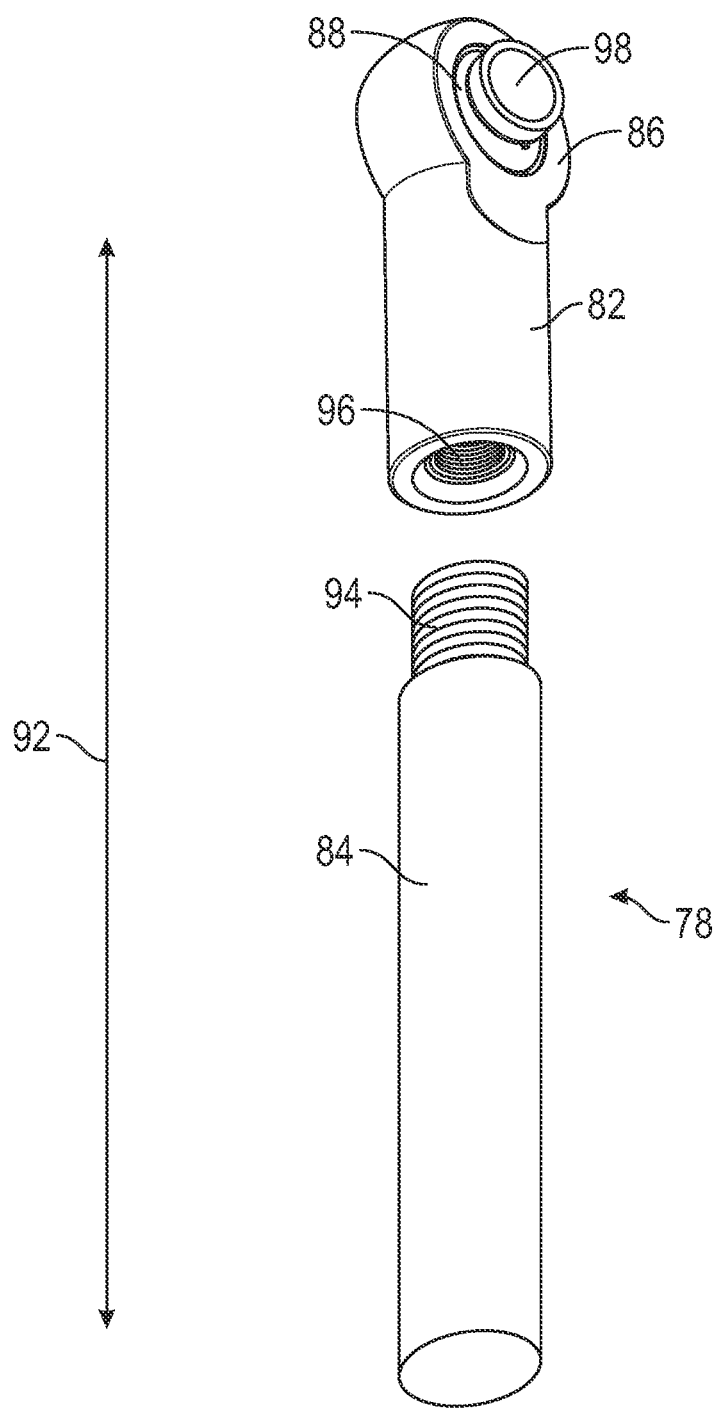
FIG. 5 is a partially disassembled view of an exemplary embodiment of a vane link.

Additionally, in some embodiments a link length 92 of the vane link 78 is adjustable to allow for positional adjustment of individual vanes 52 during setup and/or maintenance of the stator stage 50. The link body 84 may include a body thread 94, as shown in FIG. 5, with one or more of the link ends 82 having a complimentary end thread 96 via which the link end 82 is installed to the link body 84. The link length 92 is therefore adjustable by rotating the link end 82 relative to the link body 84. Nuts 106 lock the vane link 78 to the adjusted link length 92 to that the vane link 78 will not unintentionally shorten or lengthen during operation. While in the embodiment of FIG. 5 the vane link 78 is adjustable at both of the link ends 82, in other embodiments the link length 92 is adjustable at only one of the link ends 82.

While the embodiments illustrated herein include the spherical bearing member 88 in the vane link 78, in other embodiments the spherical bearing member 88 may be included in the actuation ring 72 and/or in the vane arm 74.

Figure 6:
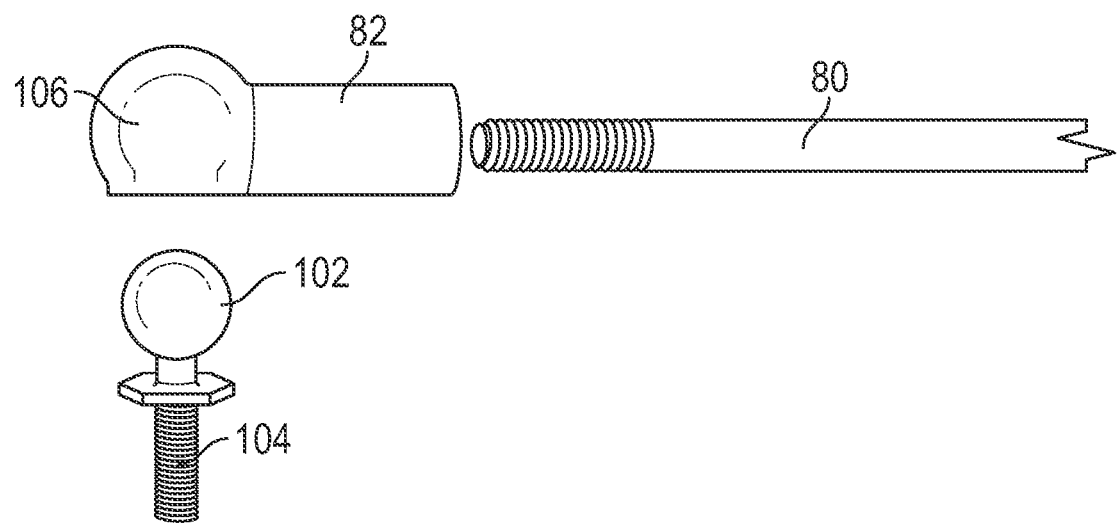
FIG. 6 is a partially disassembled view of an exemplary embodiment of a vane link.

In other embodiments, as illustrated in FIG. 6, the vane link 78 includes a ball joint configuration at at least one of the link ends 82. In one embodiment, ball member 102 is secured to via a thread 104, or alternatively firmed integral with the actuation ring 72 and/or the vane arm 74. In some embodiments the ball member 102 is made integral to the actuation ring 72 and/or the vane arm 74 via one or more of casting, additive manufacturing, sintering, or machining, and may be attached by bolting, brazing, glueing, or welding, for example. The link end 82 includes a complimentary socket 106 to receive the ball member 102 thus securing the ball member 102 to the vane link 78. Similar to the vane link 78 having the spherical bearing configuration a link length 92 may be adjustable at one or both of the link ends 82.

Use of the spherical bearing member 88 or the ball joint in the actuation assembly 70 connecting the vane arm 74, the vane link 78 and the actuation ring 72 provides a snug connection with improved mobility and reduced play or looseness in the joint, so that the risk of fretting is eliminated or greatly reduced. Additionally, the vane link 78 is adjustable to ensure all of the vanes 52 can be individually adjusted to the correct angle, resulting in a more efficient system, instead of manufacturing tolerances dictating the angle of each vane 50.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A variable pitch stator vane stage of a gas turbine engine, comprising:
    a plurality of stator vanes extending across a flowpath of the gas turbine engine; and
    an actuation assembly operably connected to the plurality of stator vanes, including:
        an actuation ring extending circumferentially around an engine central longitudinal axis of the gas turbine engine; and
        a plurality of vane links, each vane link operably connecting a corresponding stator vane of the plurality of stator vanes to the actuation ring, a vane link of the plurality of vane links including:
            a link body; and
            a first link end connected the link body, the first link end including a first spherical connection to the actuation ring;
        wherein circumferential movement of the actuation ring about the engine central longitudinal axis urges rotation of the plurality of vanes about their respective vane axes; and
    a vane arm operably connected to a vane stem of a vane of the plurality of vanes via a vane bolt and extending from the vane stem, the vane arm secured to a second link end of the vane link, the second link end including a spherical connection to the vane arm.

2. The variable pitch stator vane stage of claim 1, wherein the first link end includes:
    a first eye; and
    a first spherical bearing element disposed in the first eye;
    wherein the vane link is connected to the actuation ring through the first spherical bearing member.

3. The variable pitch stator vane stage of claim 2, further comprising a first link fastener extending through the actuation ring and the first spherical bearing member thereby connecting the vane link to the actuation ring.

4. The variable pitch stator vane stage of claim 1, wherein a length of the vane link is adjustable.

5. The variable pitch stator vane stage of claim 4, wherein the length of the vane link is adjustable via a threaded connection of the link body to the first link end.

6. The variable pitch stator vane stage of claim 1, wherein the second link end includes:
a second eye; and
a second spherical bearing member disposed in the second eye;
wherein the vane link is connected to the vane arm through the second spherical bearing member.

7. The variable pitch stator vane stage of claim 6, further comprising a second link fastener extending through the vane arm and the second spherical bearing member thereby connecting the vane link to the vane arm.

8. A compressor section of a gas turbine engine, comprising:
one or more rotor stages configured to rotate about an engine central longitudinal axis;
one or more stator stages, the one or more stator stages including a variable pitch stator vane stage including:
a plurality of stator vanes extending across a flowpath of the gas turbine engine; and
an actuation assembly operably connected to the plurality of start stator vanes, including:
an actuation ring extending circumferentially around the engine central longitudinal axis of the gas turbine engine; and
a plurality of vane links, each vane link operably connecting a corresponding stator vane of the plurality of stator vanes to the actuation ring, a vane link of the plurality of vane links including:
a link body; and
a first link end connected the link body, the first link end including a first spherical connection to the actuation ring;
wherein circumferential movement of the actuation ring about the engine central longitudinal axis urges rotation of the plurality of vanes about their respective vane axes; and
a vane arm operably connected to a vane stem of a vane of the plurality of vanes via a vane bolt and extending from the vane stem, the vane arm secured to a second link end of the vane link, the second link end including a spherical connection to the vane arm.

9. The compressor section of claim 8, wherein the first link end includes:
a first eye; and
a first spherical bearing member disposed in the first eye;
wherein the vane link is connected to the actuation ring through the first spherical bearing member.

10. The compressor section of claim 9, further comprising a first link fastener extending through the actuation ring and the first spherical bearing member thereby connecting the vane link to the actuation ring.

11. The compressor section of claim 8, wherein a length of the vane link is adjustable.

12. The compressor section of claim 11, wherein the length of the vane link is adjustable via a threaded connection of the link body to the first link end.

13. The compressor section of claim 8, wherein the second link end includes:
a second eye; and
a second spherical bearing member disposed in the second eye;
wherein the vane link is connected to the vane arm through the second spherical bearing member.

14. The compressor section of claim 13, further comprising a second link fastener extending through the vane arm and the second spherical bearing member thereby connecting the vane link to the vane arm.

15. A gas turbine engine, comprising:
a combustor section;
a turbine section driven by products of the combustion section;
a compressor section driven by rotation of the turbine section; and
a variable pitch stator vane stage disposed at at least one of the turbine section and the compressor section, the variable pitch stator vane stage, including:
a plurality of stator vanes extending across a flowpath of the gas turbine engine; and
an actuation assembly operably connected to the plurality of stator vanes, including:
an actuation ring extending circumferentially around an engine central longitudinal axis of the gas turbine engine; and
a plurality of vane links, each vane link operably connecting a corresponding stator vane of the plurality of stator vanes to the actuation ring, a vane link of the plurality of vane links including:
a link body; and
a first link end connected the link body, the first link end including a first spherical connection to the actuation ring;
wherein circumferential movement of the actuation ring about the engine central longitudinal axis urges rotation of the plurality of vanes about their respective vane axes; and
a vane arm operably connected to a vane stem of a vane of the plurality of vanes via a vane bolt and extending from the vane stem, the vane arm secured to a second link end of the vane link, the second link end including a spherical connection to the vane arm.

16. The gas turbine engine of claim 15, wherein the first link end includes:
a first eye; and
a first spherical bearing member disposed in the first eye;
wherein the vane link is connected to the actuation ring through the first spherical bearing member.

17. The gas turbine engine of claim 16, further comprising a first link fastener extending through the actuation ring and the first spherical bearing member thereby connecting the vane link to the actuation ring.

18. The gas turbine engine of claim 15, wherein a length of the vane link is adjustable via a threaded connection of the link body to the first link end.

* * * * *